Feb. 10, 1970 MICHIO SUZUKI ET AL 3,494,528

SENSING DEVICE FOR ENDLESS TAPE CARTRIDGE

Filed March 13, 1968 4 Sheets-Sheet 1

3,494,528
SENSING DEVICE FOR ENDLESS TAPE CARTRIDGE

Michio Suzuki, Tokyo, and Minoru Yokota and Yoshio Watanabe, Tokorozawa-shi, Japan, assignors to Pioneer Electronic Corporation, Tokyo, Japan Filed Mar. 13, 1968, Ser. No. 712,755
Claims priority, application Japan, Mar. 18, 1967, 42/16,620; Apr. 17, 1967, 42/24,016
Int. Cl. G11b *15/28, 15/66*
U.S. Cl. 226—90 3 Claims

ABSTRACT OF THE DISCLOSURE

Sensing apparatus cooperating with a movable pinch roller for a magnetic tape recorder allowing use of two types of endless tape cartridges, whereby, during loading of the same, alternate sensing means are employed to ensure that the pinch roller is moved into position for cartridges having a roller receiving opening only.

Background of the invention

Magnetic sound players or tape recorders may employ endless tape cartridges of two types, one of which includes a pinch roller carried by the cartridge, while the other fails to include the pinch roller therein. It is often required that the record player be provided with means for playing either of the two types of cartridges. However, various sensing devices are incorporated within the record player to sense the particular cartridge being used. Heretofore, the cartridge, which includes the pinch roller, normally incorporates a side corner ramp at the outer forward end of the cartridge so that the cartridge may be loaded relative to the sensing device. However, since cartridges which do not include pinch rollers have also employed such ramp corners, it is impossible to sense all cartridges under existing sensing methods by the mere employment of a ramp corner on the side of the cartridge.

Summary of the invention

The present invention relates to a sensing device for endless tape cartridges which, when employed with cartridges incorporating pinch rollers therein, allows the cartridge to be sensed during loading or insertion in such a manner that the main element of the sensing device is purposely made ineffective due to the structural characteristics of the bottom of the cartridge, since such a cartridge does not have a guide opening for a separate pinch roller. Thus, the separate or exterior pinch roller, during sensing, is not swung into position relative to the inserted cartridge and is held in a predetermined operating position by means of a locking device of the playing unit, while at the same time allowing complete ease in loading of the cartridge of the usual type which does not include the pinch roller.

Further, the invention provides a novel and improved sensing device which permits cartridges incorporating an internal pinch roller and those which do not to be interchangeably loaded within the magnetic sound player or recorder, and in each case, the loading of the endless tape cartridge is positively sensed. The sensing device of the present invention is inexpensive, easy to manufacture and utilizes a minimum number of components allowing for mass production of the same.

Description of preferred embodiments

Figure 1:
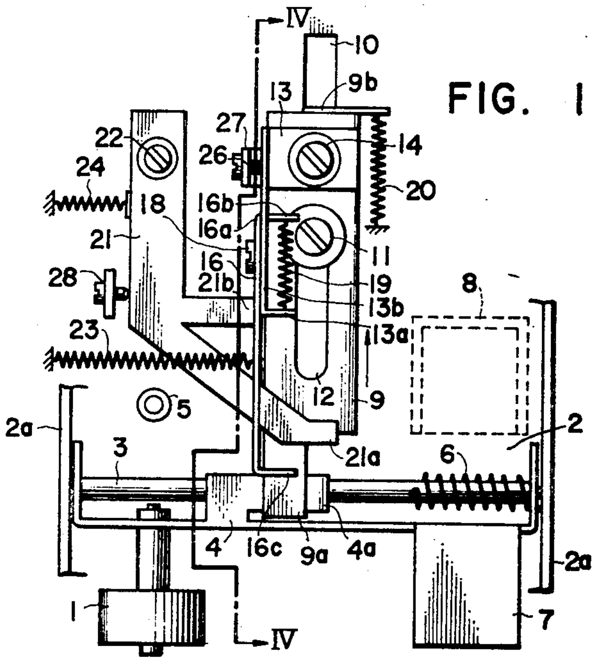
FIGURE 1 is a top plan view of one embodiment of the sensing device of the present invention prior ot loading of the endless tape cartridge.

Referring to FIGURES 1 through 4 of the drawings, a pinch roller 1 is shown as secured for rotation about its axis on a pinch roller support plate 4 which is pivotably mounted on a transverse pin 3 which is fixed to pin supporting base plates 2*a* integrally formed with base plate 2 of the magnetic sound player or tape recorder. The pinch roller 1 is so arranged that, when it is swung vertically from the horizontal position shown against the bias of the restoring spring 6 which is anchored to pin 3 and coupled to the pinch roller support plate 4, the pinch roller engages the capstan shaft 5 in frictional contact. Concurrently, armature 7, which is carried by plate 4, swings into a predetermined position whereby it is attracted by a magnet 8 (shown in dotted form), whereby these elements secure the desired precise engagement of the capstan shaft 5 with the pinch roller 1. A slide plate 9 slides on the base plate 2, one end portion 9*a* of which is of hook-shape form. When slide plate 9 is moved in the direction of the arrow of FIGURE 1, a corresponding engaging portion 4*a* of the pinch roller support plate 4 is engaged with the hook-shaped end portion 9*a* of plate 9 and pivoted around the pin 3 to thereby swing pinch roller 1 upwardly. Slide plate 9 is provided at the other end with a downwardly bent lub 9*b* which extends through guide slot 10 in base plate 2. The slide plate is further provided, intermediate thereof, with a guide slot 12 which receives guide pin 11, this being carried by the base plate 2. Thus, the slide plate 9 is slid along the base plate 2 in the direction of the arrow.

Figure 4:
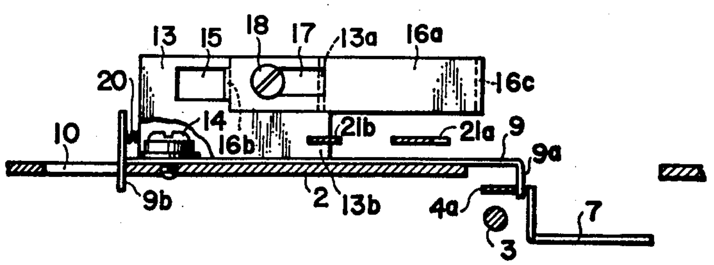
FIGURE 4 is a side elevational view of the sensing device of FIGURE 1 taken along lines 4—4 of FIGURE 1.

First sensing means 16 is mounted on slide plate 9, the sensing means 16 functioning mainly to sense the pinch roller non-including endless tape cartride. When employing an endless cartridge which incorporates or includes a pinch roller, the first sensing means 16 is withdrawn from the cartridge along the ramp corner portion, such as portion 32 of cartridge 30. A P-shaped plate or rotor 13 is rotatably mounted on the slide plate 9 by means of screw 14 (see FIGURE 4). The rotor 13 is provided with a guide aperture 15 which receives one bent end 16*b* of a first sensing member 16*a* which forms a part of the first sensing means 16. The first sensing member 16*a* is also provided with a guide aperture 17 through which is positioned a guide screw 18 which is secured to the rotor 13. A bent portion 13*a* is provided at the free end of rotor 13 and cooperates with bent portion 16*b* of the first sensing member 16, since these members carry a tension spring 19 therebetween which urges the first sensing member 16*a* to the right (FIGURE 4). The spring tension of spring 19 is important as will be explained in greater detail, and is stronger than that of spring 6. The other end portion 16*c* of the first sensing member 16*a* is bent substantially rectangularly and is provided with a smoothly finished outer surface to engage the forward end surface 37 of the cartridge 30. Thus, the first sensing means comprises the rotor 13 and the first sensing member 16*a*, which is interconnected to rotor 13 by means of spring 19. A spring 20 is anchored at one end to the base 2 and at the other end to the side plate 9 and is under tension when the cartridge is loaded but is restored to its original state as the cartridge is removed.

A second sensing means 21 is provided to operate mainly to sense the presence of a cartridge which incorporates a pinch roller therein. The second sensing means 21 has a fork-shaped portion with two integrally formed legs. The end 21*a* of one leg performs a sensing function, while the other leg provides an actuating end portion 21*b*. Thus, when the pinch roller including cartridge 40 is loaded, the second sensing end 21*a* is rotated about the axis of screw 22 carried by base plate 2 in a counterclockwise direction and concurrently, the first sensing means 16 is also rotated by movement of the actuating end 21*b* of the second sensing means 21 in the same direction (this operation will be described in detail hereinafter). Now, since the first sensing end 16*c* is displaced out of the inclined ramp 32 of the cartridge and therefore, the first sensing means 16 is rotated about the axis of screw 14, slide plate 9 with the end portion 9*a* is not forwardly advanced and therefore, the pinch roller 1 is prevented from swinging upwardly. First sensing means 16 and second sensing means 21 are provided with restoring springs 23 and 24, respectively, the ends of which are secured to base plate 2.

The operation of the sensing device in loading of the two different types of tape cartridges will be described in detail.

Figure 2:
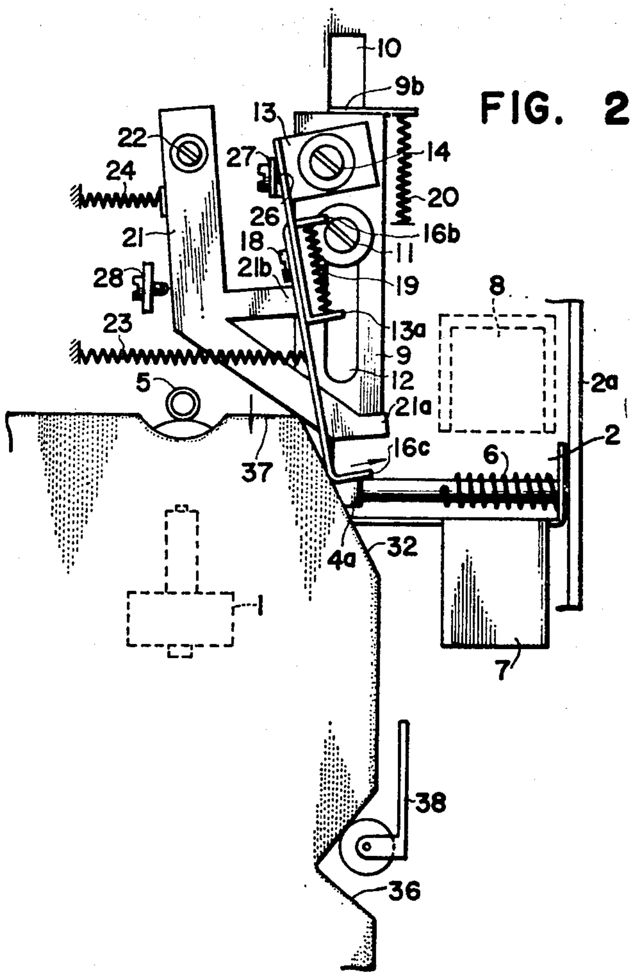
FIGURE 2 is a top plan view of the sensing device of FIGURE 1 after loading of a cartridge which incorporates an internal pinch roller.

It is assumed initially that a cartridge which includes or incorporates a pinch roller therein, as, for example, a cartridge for eight tape tracks, is loaded within the magnetic tape sound player or tape recorder (FIGURE 2). In this case, the cartridge has no guide opening 35 in its bottom plate for receiving the exterior, separate pinch roller 1. The forward end surface 37 of cartridge 30 engages the first sensing member end 16*c* and advances the same forwardly against the bias of spring 19 until the same end surface 37 contacts the second sensing member end 21*a*. At this moment, since spring member 19 is stronger than spring 20, the slide plate 9 is advanced by the rotor 13 and in turn, the pinch roller 1 swings upwardly due to movement of slide plate 9 until the pinch roller 1 lightly contacts the bottom surface of the cartridge. Under non-operating conditions, the pinch roller 1 is normally angularly inclined slightly downwards, (about 20°), from the horizontal. Thus, roller 1 moves into horizontal position with the pinch roller 1 pushing weakly against the bottom surface of the cartridge. At this point, the pinch roller 1 stops pivoting or swinging. As the forward end 37 continues to advance, the end 21*a* of the second sensing member is rotated in a counterclockwise direction leaving the first sensing end 16*c* engaged with the forward end 37 of the cartridge. At this moment, since the pinch roller 1 is prevented from continuing to pivot by the presence of the bottom of the cartridge, the slide plate 9 and hence, rotor 13 terminate their sliding movement. Rotor 13 (FIGURE 4) with the first sensing means 16 rotates about the axis of screw 14 in a counterclockwise direction as the result of continued rotation of the actuating end 21*b* of second sensing means 21. This results in sensing end 16*c* being displaced from left to right to ramp portion 32 of the cartridge, as shown in FIGURE 2, whereby slide plate 9 is restored to its original position by means of spring 19, therefore, the end portion 9*a* of slide plate 9 does not actuate its engaged end portion 4*a* of the pinch roller support plate 4. Thus, pinch roller 1 does not swing upwardly to any greater extent and armature 7 is unattracted by magnet 8.

During cartridge removal from the magnetic sound player, the first sensing means 16 and the second sensing means 21 are pivoted about corresponding screws 14 and 22, respectively, by means of springs 23 and 24, respectively, thereby being restored to their original positions. Numerals 26 and 28 designate adjustable stops for the first sensing means 16 and the second sensing means 21, respectively.

Figure 3:
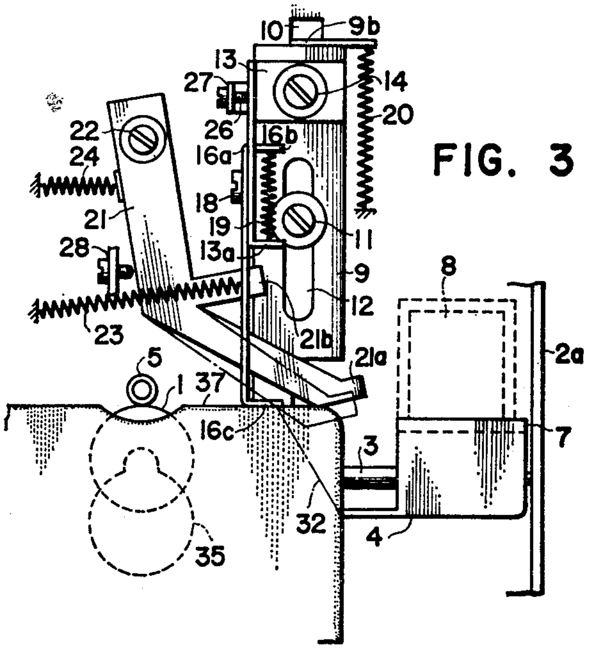
FIGURE 3 is a top plan view of the sensing device of FIGURE 1 after loading of an endless tape cartridge of the nonroller including type.
Figure 9A:
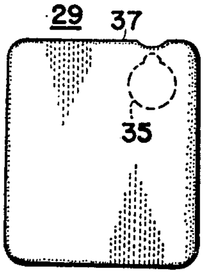
FIGURE 9*a* is a top plan view of one form of endless tape cartridge of the pinch roller non-including type employed with the sensing means of the present invention.
Figure 9B:
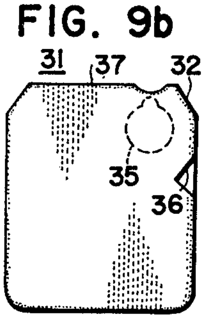
FIGURE 9*b* is a top plan view of an endless cartridge in modified form of the pinch roller non-including type which may be employed with the sensing device of the present invention.
Figure 9C:
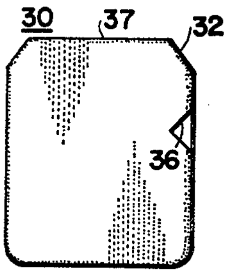
FIGURE 9*c* is a top plan view of an endless cartridge of the pinch roller including type which may be employed with the sensing device of the present invention.

The sensing device operates differently during loading of a cartridge which does not incorporate a pinch roller therein, such as either cartridge 29 or cartridge 31 of FIGURES 9*a* and 9*b*, respectively. Such a cartridge may employ a four track tape and the operation of the sensing device in conjunction device therewith may be seen by reference to FIGURE 3. In this case, the cartridge does not include the pinch roller, is provided with a pinch roller guide opening 35 within the bottom plate to allow the separate, exterior pinch roller 1 to pass therethrough. Initially, the end 16*c* of the first sensing means 16 engages the outer forward end surface 37 of cartridge 29, for instance, and is pushed forwardly against spring 19. The P-shaped plate or rotor 13 and hence, slide plate 9 are also displaced forwardly. Pinch roller 1 is thus swung upwardly or pivoted about pin 3 toward opening 35 of cartridge 29 and moved substantially into a horizontal position, because spring 19 is stronger than the sum of springs 6 and 20. During the next step, when the forward end 37 of the cartridge is further advanced, the end 37 engages the second sensing means 21, at end 21*a*, thereby rotating the second sensing means 21 about the axis of screw 22 in a counterclockwise direction. Therefore, pinch roller 1 begins to enter the guide opening 35 of cartridge 29. The end 13*b* of rotor 13 advances forwardly to a position where end 13*b* is no longer engaged with the actuating end 21*b* of the second sensing means 21. The actuating end 21*b* and sensing means 21 continue to rotate about the axis of screw 22 in a counterclockwise direction without any obstruction (FIGURES 3 and 4). Slide plate 9 continues to slide until the pinch roller 1 is swung or pivoted into engagement with capstan 5, thus achieving complete loading of the cartridge 29. At this instant, armature 7 is magnetically pulled toward magnet 8, thereby causing the pinch roller 1 to firmly press against capstan 5. Releasing means (not shown) are provided for removing the cartridge from the magnetic sound player. During actuation of the releasing means, the armature 7 is first removed from magnet 8 and hence, the pinch roller is removed from capstan 5. The cartridge 29 is restored to its original position and slide plate 9 and first sensing means 16 are restored by the spring 20 and the second sensing means 21 is restored by spring 24 to the normal state.

From the above description, it will be apparent that the sensing device will operate in an excellent manner to the same extent whether the cartridge is provided with a ramp portion or not.

A second embodiment of the invention, in the form of a modified sensing device which is constructed in accordance with the principles of the invention, is shown in FIGURES 5 through 8 of the drawings, the main difference between these two devices existing in the arrangement of the second sensing means. Like reference characters are employed and refer to similar parts and positions throughout the views of the drawings.

Figure 5:
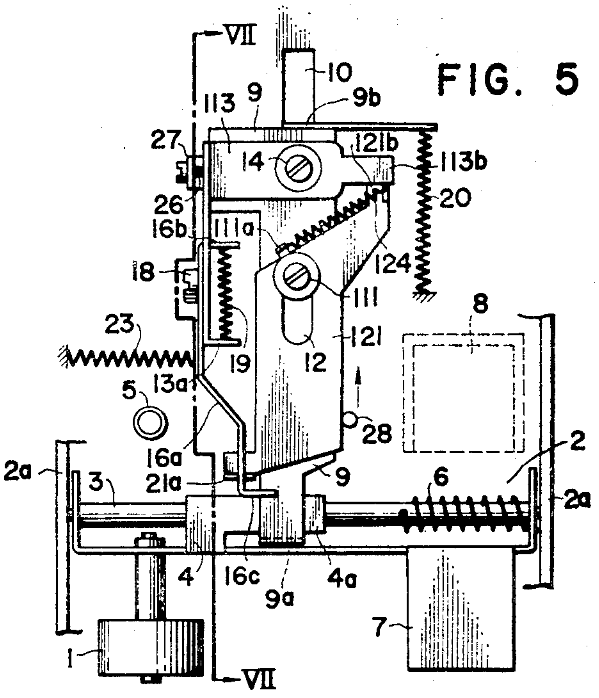
FIGURE 5 is a top plan view of a modified sensing device of the present invention prior to loading of the endless tape cartridge.
Figure 7:
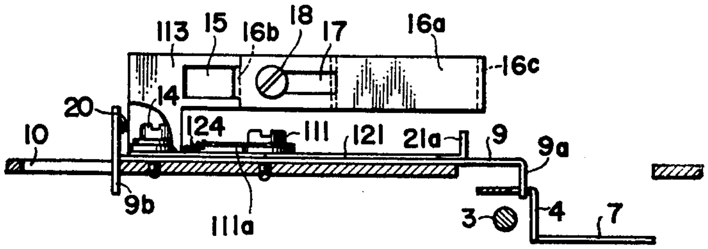
FIGURE 7 is a side elevational view of the sensing device of FIGURE 5 taken about lines 7—7 of FIGURE 5.

Turning to the drawings, there is again provided a pinch roller 1, a base plate 2, a pin supporting base plate 2*a*, a pin 3, a pinch roller support plate 4, a plate engaging portion 4*a*, a capstan shaft 5, a coil spring 6, an armature 7, a magnet 8, a slide plate 9, having a hook-shaped end portion 9*a*, and a downwardly bent lug 9*b*. Further, there is provided a guide slot in the base plate 10, a guide slot 12, a first sensing member 16*a*, which includes a bent portion 16*b* and a first sensing end 16*c*. Similarly, a guide aperture 17 is provided which receives screw 18, and again, a tension spring 19 and a separate spring 23. These parts are the same in size and function as those in the first-mentioned sensing device such that a detailed description of the above-mentioned parts will be omitted with some exception. As the slide plate 9 and the first sensing member 16*a* are the same as those of the first embodiment, the description is mainly directed to the second sensing member 121. The second sensing member or means 121 is employed mainly to sense the presence of a cartridge which carries its own pinch roller. The second sensing means 121 is provided with an enlarged guide slot 12 which is registered with a corresponding guide slot carried by slide plate 9 and is rotated about a guide pin 111 fixed to the base plate 2 for guiding slide plate 9. The end 21*a* of the second sensing means engages the outer forward end surface of the cartridge. A rotor 113 is interlocked by the engagement of locking end 121*b* with a locked end portion 113*b* of rotor 113 of the first sensing means 116. It is only when the pinch roller carrying cartridge is loaded that this locking is released. A spring 124, which is secured to guide pin 111 and the locking end 121*b* of the second sensing means 121, is tensioned when the second sensing means 121 is slid upwardly (FIGURE 5). When the second sensing means 121 is restored to its normal (original) position by spring 124, the second sensing means is interlocked with the first sensing means 116. When the cartridge is removed from the tape record player, the spring 124 operates to move the second sensing means 121 rearwardly.

In operation, the modified sensing device of FIGURES 5 through 8 will be described with reference to both types of cartridges.

Figure 6:
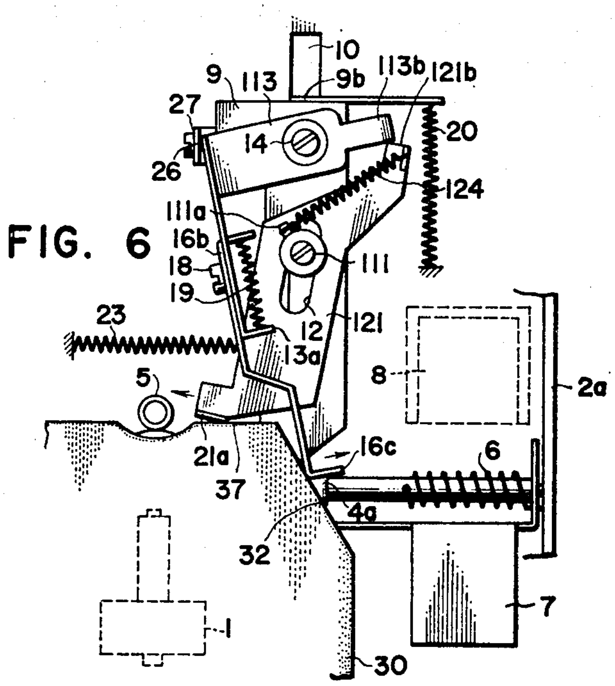
FIGURE 6 is a top plan view of the sensing device of FIGURE 5 after loading of a cartridge incorporating an internal pinch roller.
Figure 8:
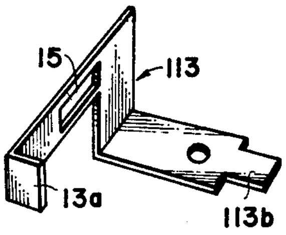
FIGURE 8 is a perspective view of the rotor element forming a part of the sensing device of FIGURE 5.

Assuming initially that a cartridge, such as cartridge 30 having eight tracks and carrying its own pinch roller, is loaded into the magnetic tape player (FIGURE 6). In this case, cartridge 30 has no guide opening in its bottom plate to receive the exterior and separate pinch roller 1. The outer forward end surface 37 of the cartridge engages the first sensing means 16*c* and advances the same in a forward direction against the bias of spring 19 until the end surface 37 makes contact with the second sensing means end 21*a*. At this point, slide plate 9 is advanced by rotor 113 and in turn, the pinch roller 1 is swung upwardly by slide plate 9 until the pinch roller 1 lightly contacts the bottom surface of the cartridge. Thus, when the pinch roller is just horizontal, the bottom surface of the cartridge is weakly engaged by the pinch roller and the pinch roller stops swinging or rotating and in turn, stops the advancement of slide plate 9. As the cartridge continues to advance in a forward direction, the forward end face 37 maintains engagement with the end 16*c* of the first sensing means and then engages the end 21*a* of the second sensing means. Advancing the cartridge even further causes the first sensing means 116 to also advance against the bias of spring 19, but the rotor 113 is prevented from advancing so the second sensing means 121 continues to advance in a forward direction, as viewed in FIGURE 6, and then pushes on the locked end portion 113*b* of rotor 113 so as to rotate the rotor 13 along with the first sensing means 116 about the axis of screw 14 and against spring 23 in a counterclockwise direction. Concurrently, the end portion 21*a* of the second sensing means is pivoted in a clockwise direction as it is located to the left of ceinter line 111 of the second sensing means 121 and the lock between the locked ends 113*b* and the locking end 121*b* is released. At this point, as viewed in FIGURE 5, since the pinch roller is pushed down and stopped from swinging upwardly against the bottom of the cartridge, further sliding of slide plate 9 ceases, hence, the first sensing means 116 is rotated n a counterclockwise direction. Therefore, the first sensing means 116 is restored by restoration of spring 19 and the slide plate 9 is restored by restoration of springs 20 and 6. As a result, the end 16*c* of the first sensing means moves to the outside of the forward inclined ramp portion 32 of the cartridge and the hook-shaped end portion 9*a* of the slide plate never actuates the engaging end portion 4*a* of the pinch roller supporting plate 4. Pinch roller 4, therefore, never moves upwardly past horizontal position and armature 7, therefore, remains unattracted by magnet 8. In this position, instead of the pinch roller 1 within the player being engaged with capstan 5, it is the pinch roller (not shown) which engages the same.

When cartridge 32 is removed from the player, the first sensing means pivots in a clockwise direction and is restored to its original position by spring 23, while the second sensing means is restored by spring 124. This results in interlocking end portion 121*b* and the locking end portion 113*b*.

The operation of the modified sensing device of FIGURES 5 through 8 is further described in conjunction with the loading of a non-pinch roller carrying or including cartridge, for example, either the cartridge of FIGURE 9*b* or the cartridge of FIGURE 9*a*. In this case, each cartridge has a guide opening 35 in its bottom plate to receive the separate, exterior, pivotably pinch roller 1 carried by the player. Initially, sensing end 16*c* of the first sensing means 116 is engaged by the outer forward end surface 37 of the cartridge during insertion and moves forwardly against spring 19. The rotor 113 and hence, the slide plate 9 are also displaced in a forward direction and the pinch roller 1 swings toward the open window 35 of the cartridge in substantially a horizontal position, because spring 19 is arranged in like manner to the FIGURE 1 embodiment to be of greater strength than the sum of springs 6 and 20. During continued movement, when the forward end 37 of the cartridge is advanced to a greater extent, end 37 also engages the end 21*a* of the second sensing means to advance the second sensing means 121 forwardly. It is then that pinch roller 1 actually enters into the guide opening 35 of the cartridge. End 121*b* of the second sensing means 121 does not, in this case, positively move end 113*b* of rotor 113. Thus, the first sensing means 116 is advanced without obstruction. The slide plate 9 continues to slide and swings the pinch roller 1 upwardly about its axis of rotation until the pinch roller engages capstan 5 at the point where the cartridge is completely loaded. Simultaneously, armature 7 is magnetically attracted to the magnet 8 to cause the pinch roller 1 to press firmly against the capstan 5.

On actuating releasing means (not shown), the armature 7 is first removed from the magnet 8 and the sensing device for sensing the presence of the cartridge is restored to its initial position and ready for the next sensing operation.

What is claimed is:

1. A sensing device for discriminating between endless tape cartridges of the pinch roller carrying and pinch roller non-carrying type during loading of the same within a magnetic tape player which also carries a separate pinch roller exterior of the cartridge and a capstan for driving the same, said sensing device comprising: a slide plate mounted on the base of said player, means carried by said slide plate for swinging said separate pinch roller upwardly into contact with said capstan in response to sliding movement thereof relative to said base, first sensing means rotatably mounted on said slide plate, positioned in the path of the leading edge of an inserted cartridge and operatively coupled therewith to normally cause sliding movement of said plate, and second sensing means mounted for rotation on said player and positioned in the path of said inserted cartridge leading edge for moving said first sensing means out of leading edge engagement with said inserted cartridge.

2. The sensing device as claimed in claim 1 wherein said slide plate is provided with a hook-shaped end operatively coupled to said separate pinch roller for swinging the same, said first sensing means includes a P-shaped plate having a forked end receiving portion, means for pivotably mounting said P-shaped plate on said side plate, means for slidably connecting said first sensing member on said P-shaped plate, spring means coupling said P-shaped plate and said first sensing member, said first sensing member having an end portion engaging the leading edge of said cartridge, whereby in loading said cartridge said first sensing member causes said P-shaped plate to be displaced under the bias of said spring means, said device further including means for pivoting said second sensing means at one end, with the free end thereof to contact with the leading edge of said cartridge and carrying an actuating fork end intermediate thereof for moving said first sensing means out of the path of said cartridge during loading of a pinch roller carrying cartridge.

3. The sensing device as claimed in claim 1 wherein said side plate is provided with a hook-shaped end, operatively coupled to said separate pinch roller for swinging the same into contact with said capstan, said first sensing means includes a rotor, means pivotably mounting said rotor on said side plate, said rotor having a locked portion at one end thereof, means for slidably connecting said first sensing means to said rotor, spring means coupling said rotor to said first sensing means, said first sensing means having an end portion in engagement with the leading edge of said cartridge, whereby in loading said cartridge, said first sensing means causes said rotor to be displaced, a guide slot carried by said second sensing means, means including said guide slot for pivotably and slidably coupling said second sensing means to said plate, said second sensing means including a free end for contacting the leading edge of said cartridge and a locking end for rotating said first sensing means out of the path of said cartridge in response to player loading of a pinch roller carrying cartridge.

References Cited

UNITED STATES PATENTS

| | | | |
|---|---|---|---|
| 3,337,105 | 8/1967 | Wilson | 226—180 X |
| 3,425,609 | 2/1969 | Beville | 226—180 X |

M. HENSON WOOD, Jr., Primary Examiner

R. A. SCHACHER, Assistant Examiner

U.S. Cl. X.R.

226—180, 181; 242—55.19, 180